(12) United States Patent
Tang

(10) Patent No.: US 9,766,740 B2
(45) Date of Patent: Sep. 19, 2017

(54) METHOD FOR DRIVING LIQUID CRYSTAL PANEL

(71) Applicant: Shenzhen China Star Optoelectronics Technology Co., Ltd., Shenzhen, Guangdong (CN)

(72) Inventor: Yuejun Tang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 227 days.

(21) Appl. No.: 14/435,517

(22) PCT Filed: Jan. 21, 2015

(86) PCT No.: PCT/CN2015/071216
§ 371 (c)(1),
(2) Date: Apr. 14, 2015

(87) PCT Pub. No.: WO2016/106902
PCT Pub. Date: Jul. 7, 2016

(65) Prior Publication Data
US 2016/0342261 A1 Nov. 24, 2016

(30) Foreign Application Priority Data
Dec. 31, 2014 (CN) .......................... 2014 1 0854121

(51) Int. Cl.
*G06F 3/041* (2006.01)
*G09G 3/36* (2006.01)
*G09G 3/20* (2006.01)

(52) U.S. Cl.
CPC .......... *G06F 3/0416* (2013.01); *G06F 3/0412* (2013.01); *G09G 3/2077* (2013.01); *G09G 3/3611* (2013.01); *G09G 3/3685* (2013.01); *G09G 2310/027* (2013.01); *G09G 2310/0251* (2013.01); *G09G 2310/06* (2013.01); *G09G 2310/08* (2013.01); *G09G 2320/0252* (2013.01)

(58) Field of Classification Search
CPC ....... G06F 3/0412; G06F 3/0416; G09G 3/36; G09G 3/3685; G09G 2310/0251; G09G 2310/027; G09G 2310/06; G09G 2320/0252
See application file for complete search history.

(56) References Cited

U.S. PATENT DOCUMENTS

| | | | |
|---|---|---|---|
| 2003/0122758 A1* | 7/2003 | Lee ........................ | G09G 3/2011 345/89 |
| 2013/0328755 A1* | 12/2013 | Al-Dahle ............. | G09G 3/3655 345/87 |
| 2015/0154929 A1* | 6/2015 | Li ........................ | G09G 3/3611 345/212 |

* cited by examiner

*Primary Examiner* — Nelson Rosario
(74) *Attorney, Agent, or Firm* — Andrew C. Cheng

(57) ABSTRACT

Disclosed is a method for driving a liquid crystal panel, which includes: when a greyscale value of the liquid crystal panel is smaller than a first grey level, a first driving voltage that is a normal driving voltage corresponding to the greyscale value is applied to drive the data lines; and when the greyscale value of the liquid crystal panel is greater than the first grey level and smaller than or equal to a maximum grey level, driving of the data lines includes a first phase and a second phase, the first phase being in front of the second phase, the first phase using a second driving voltage smaller than or equal to the first driving voltage to drive the liquid crystal panel, the second phase using a third driving voltage that is a normal driving voltage corresponding to the greyscale value to drive the liquid crystal panel.

9 Claims, 4 Drawing Sheets

METHOD FOR DRIVING LIQUID CRYSTAL PANEL

CROSS REFERENCE TO RELATED APPLICATIONS

This application claims the priority of Chinese Patent Application No. 201410854121.2, entitled "Method for Driving Liquid Crystal Panel", filed on Dec. 31, 2014, the disclosure of which is incorporated herein by reference in its entirety.

BACKGROUND OF THE INVENTION

1. Field of the Invention

The present invention relates to a method for driving a liquid crystal panel.

2. The Related Arts

Compared to traditional display devices, a liquid crystal display has advantages including being light and thin, low power consumption, and low radiation and is widely used in various fields including computers, mobile phones, and automobile display screens. With the widening use of the liquid crystal panel, people increasingly demand higher and higher performance of the liquid crystal display.

With the progress of the liquid crystal display technology, various display modes have been proposed for display screens, among which an IPS (In-Plane Switching) liquid crystal display panel and an FFS (Fringe Field Switching) liquid crystal display panel have been favored by a large of general consumers due to relatively high view angles.

However, when a finger of user is placed on and slides along an IPS liquid crystal display panel or an FFS liquid crystal display panel for conducting operation through touches, disclination lines in the liquid crystal display panel gets expanding with the slide of the finger. This makes liquid crystal molecules contained in the liquid crystal layer converted to a vertical rotation or chaos condition. If the liquid crystal molecules are not timely caused to resume a horizontal rotation condition, a trace mura would occur in the liquid crystal display panel thereby affecting the displaying quality of the liquid crystal display panel.

Thus, it is desired to provide a liquid crystal display panel and a liquid crystal display device that overcome the problems of the prior art.

SUMMARY OF THE INVENTION

The technical solution to be addressed in the present invention is to provide a method for driving a liquid crystal panel that alleviates poor finger touch phenomena and improves the performance of the liquid crystal panel.

To achieve the above object, an embodiment of the present invention provides the following technical solutions:

A method for driving a liquid crystal panel is provided, wherein the liquid crystal panel comprises a plurality of gate lines and a plurality of data lines, the gate lines and the data lines intersecting and perpendicular to each other to form a plurality of pixels arranged in the form of an array, the method for driving the liquid crystal panel comprising: when a greyscale value of the liquid crystal panel is smaller than a first grey level, a first driving voltage is applied to drive the data lines, the first driving voltage being a normal driving voltage corresponding to the greyscale value; and when the greyscale value of the liquid crystal panel is greater than the first grey level and smaller than or equal to a maximum grey level, driving of the data lines is performed with an operation comprising a first phase and a second phase, the first phase being in front of the second phase, the first phase being such that a second driving voltage is applied to drive the liquid crystal panel and the second driving voltage is smaller than or equal to the first driving voltage, the second phase being such that a third driving voltage is applied to drive the liquid crystal panel, the third driving voltage being a normal driving voltage corresponding to the greyscale value.

In the above method, when the greyscale value of the liquid crystal panel is greater than the first grey level and smaller than the maximum grey level, an intermediate phase is included between the first phase and the second phase, the intermediate phase being such that a fourth driving voltage is applied and the fourth driving voltage is greater than the third driving voltage and smaller than the saturation voltage in order to increase a response speed of the liquid crystal panel.

In the above method, the first phase, the intermediate phase, and the second phase take place consecutively.

In the above method, the first phase and the second phase take place consecutively.

In the above method, switches of an mth one of the gate lines are turned on for a first time period and within the first time period, the normal driving voltage corresponding to the greyscale value of the mth gate line is applied for charging and then the gate switches of the mth line are turned off and switches of an (m+n)th one of the gate lines are turned on for a second time period and within the second time period, the second driving voltage is applied to charge the (m+n)th one of the gate lines, m and n being both natural numbers greater than 1.

In the above method, the first time period and the second time period are consecutive and after the second time period ends, charging is performed on an (m+1)th one of the gate lines and a normal driving voltage corresponding to the greyscale value of the (m+1)th one of the gate lines is used.

The present invention provides a solution where when the greyscale value of a liquid crystal panel is greater than the first grey level and smaller than the maximum grey level, this being a condition of high grey levels, charging with driving voltage is performed in a two phase manner, which comprises a first phase and a second phase and the first phase is in front of the second phase, wherein the first phase is such that a second driving voltage is applied to drive the liquid crystal panel, where the second driving voltage is smaller than or equal to the first driving voltage; and the second phase is such that a third driving voltage is applied to drive the liquid crystal panel, where the third driving voltage is a normal driving voltage corresponding to the greyscale value. Driving performed in the first phase with the lower voltage would establish a stronger horizontal electric field and a weaker vertical electric field, making it helpful for liquid crystal molecules, which are in a standing condition as being pressed by a finger, to resume a lying condition thereby achieving the purposes of improving a poor phenomenon of finger touching and enhancing the performance of the liquid crystal panel. The normal driving voltage used in the second phase may be close to the saturation voltage, making it helpful to increase the transmittance of the liquid crystal panel.

BRIEF DESCRIPTION OF THE DRAWINGS

To more clearly explain the technical solution proposed in the present invention, a brief description of the drawings that are necessary for describing embodiments is given as follows. It is obvious that the drawings that will be described below show only some embodiments of the present invention. For those having ordinary skills of the art, other drawings may also be readily available from these attached drawings without the expense of creative effort and endeavor.

DETAILED DESCRIPTION OF THE PREFERRED EMBODIMENTS

A clear and complete description will be given to a technical solution proposed in an embodiment of the present invention with reference to the attached drawings of the embodiment of the present invention.

The present invention relates to a method for driving a liquid crystal panel. The liquid crystal panel comprises a plurality of gate lines and a plurality of data lines. The gate lines and the data lines intersect in a manner of being perpendicular to each other to form a plurality of pixels arranged in the form of an array. The plurality of gate lines is arranged side by side to extend in a first direction and parallel to each other. The plurality of data lines is arranged side by side to extend in a second direction and parallel to each other. The first direction is perpendicular to the second direction. The direction of extension of the gate lines is defined as a row direction and the direction of extension of the data lines is defined as a column direction.

Figure 1:
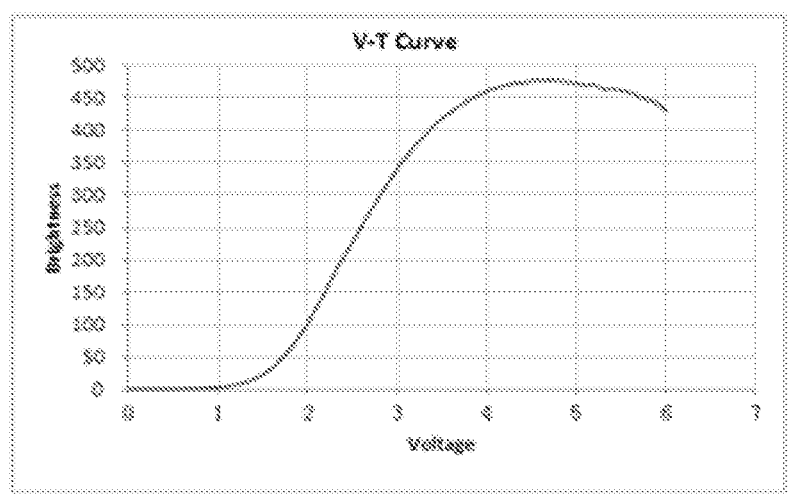
FIG. 1 is a diagram showing a V-T curve of a liquid crystal panel measured with an actual product.

FIG. 1 is a diagram showing a V-T curve of a liquid crystal panel measured with an actual product, of which the saturation voltage is 4.5V. After the liquid crystal panel is lit up, a driving voltage is varied and a finger touches and presses the panel to slide thereon. It is found that when the driving voltage is reduced to 3.5V, trace mura phenomenon vanishes in 2 seconds. To meet a specification that requires trace mura to vanish in 2 seconds, the highest driving voltage must be lowered from 4.5V to 3.5V, but this severely reduce the transmittance of the liquid crystal panel and lowers the brightness of the panel.

The method for driving a liquid crystal panel according to the present invention comprises: when a greyscale value of a liquid crystal panel is smaller than a first grey level, a first driving voltage is applied to drive the data lines, wherein the first driving voltage is a normal driving voltage used for the specific greyscale value corresponding thereto. The definition of the first driving voltage for the first grey level is as follows. When a finger touches and presses the liquid crystal panel, if the trace mura phenomenon of the liquid crystal panel vanished in a specified time interval, then the liquid crystal panel is considered satisfying requirements. The specified time interval is a time interval specified by a user for the liquid crystal panel, such as 2 seconds. Different users may specify different time intervals for the vanishing of a trace mura phenomenon after a liquid crystal panel has been pressed by a finger. When a first driving voltage is applied for driving and the trace mura phenomenon vanishes within the specified time interval, such a situation is set as the greyscale value being the first grey level. When the greyscale value of the liquid crystal panel is greater than the first grey level but smaller than or equal to a maximum grey level, the driving of the data lines comprises a first phase and a second phase, wherein the first phase precedes the second phase. The first phase is such that a second driving voltage is applied to drive the liquid crystal panel and the second driving voltage is smaller than or equal to the first driving voltage; the second phase is such that a third driving voltage is applied to drive the liquid crystal panel and the third driving voltage is the normal driving voltage used for the specific greyscale value corresponding thereto.

Figure 2:
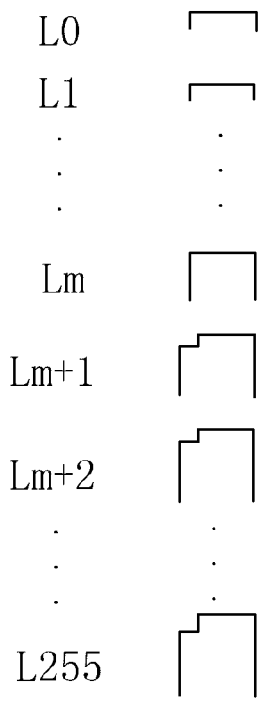
FIG. 2 is a schematic view illustrating a method for driving a liquid crystal panel according to an embodiment of the present invention.
Figure 3:
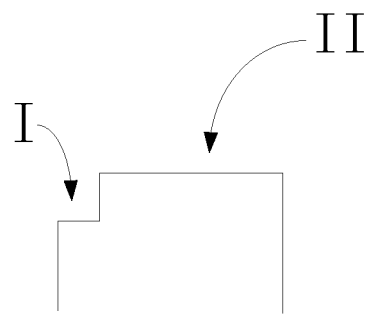
FIG. 3 is an enlarged view showing a data waveform of FIG. 2.

As shown in FIGS. 2 and 3, FIG. 2 includes date waveforms and FIG. 3 is an enlarged view of one data waveform of FIG. 2. FIG. 2 illustrates grey levels of a liquid crystal panel from L0 to L255 and in the drawing, for grey levels L0-Lm, driving is made with the normal driving voltages and for grey levels L0-Lm, no trace mura phenomenon appears when the liquid crystal panel is touched and pressed. For grey level L255, driving is made with the saturation voltage. For grey levels Lm-L255, the trace mura phenomenon appears after the liquid crystal panel is touched and pressed by a finger. Thus, the driving method of the present invention divides the data waveforms of Lm-L55 into two phases, I and II. In other words, the driving of the data lines comprises a first phase (which is marked I in FIG. 3) and a second phase (which is marked II in FIG. 3). The second driving voltage used in the first phase is smaller than the third driving voltage of the second phase by 0.5-1.3V; the third driving voltage can be the saturation voltage.

The first phase uses a voltage that is lower than the normal driving voltage corresponding to the specific greyscale value to drive the liquid crystal panel. When a finger touches and presses the liquid crystal panel, the liquid crystal molecules exhibit a "standing" condition, the lower voltage is beneficial for the liquid crystal molecules to resume a "lying" condition and this eliminates the trace mura, which is a poor phenomenon of finger touching. The third driving voltage used in the second phase uses can be closed to or equal to the saturation voltage to help increase the transmittance of the liquid crystal panel.

In an embodiment of the present invention, when the greyscale value of the liquid crystal panel is greater than the first grey level and smaller than the maximum grey level, an intermediate phase is further included between the first phase and the second phase. The intermediate phase is such that a fourth driving voltage is applied, where the fourth driving voltage is greater than the third driving voltage and smaller than the saturation voltage in order to increase the response speed of the liquid crystal panel. In other words, a lower level of voltage is first applied to cause the liquid crystal molecules to resume lying and a voltage level that is higher than the normal driving voltage corresponding to the specific greyscale value is then applied for the purpose of increasing the response time of the liquid crystal panel.

Figure 4:
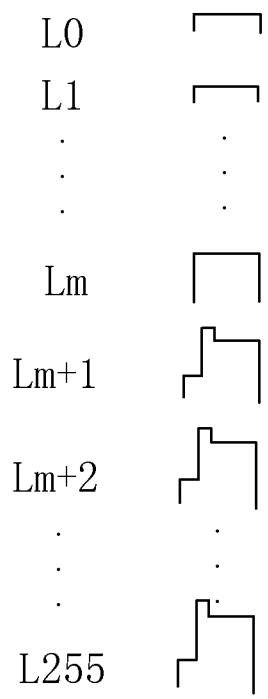
FIG. 4 is s a schematic view illustrating a method for driving a liquid crystal panel according to an embodiment of the present invention.
Figure 5:
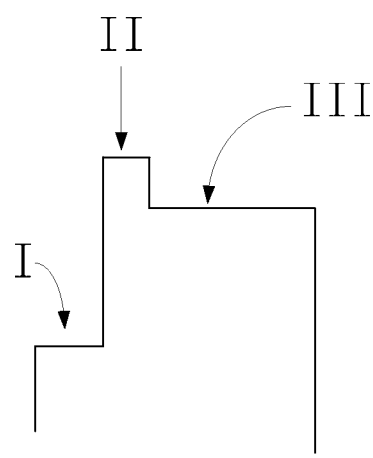
FIG. 5 is an enlarged view showing a data waveform of FIG. 4.

As shown in FIGS. 4 and 5, FIG. 4 includes date waveforms and FIG. 5 is an enlarged view of one data waveform of FIG. 4. In the drawing, for grey levels L0-Lm, driving is made with the normal driving voltages and for grey levels L0-Lm, no trace mura phenomenon appears when the liquid crystal panel is touched and pressed. For grey levels Lm-L255, the trace mura phenomenon appears after the liquid crystal panel is touched and pressed by a finger. Data waveform of grey levels Lm-L255 is divided into three phases, in which a first phase (which is marked I in FIG. 5) comprises a low voltage for eliminating trace mura, an intermediate phase (which is marked II in FIG. 5) is an over driver stage, namely applying a fourth driving voltage, which is greater than the third driving voltage and smaller than the saturation voltage, for increasing the response sped of the liquid crystal panel, wherein the purpose of this phase is to increase the response speed of LC, and a second phase (which is marked III in FIG. 5) includes a normal charging phase.

Specifically, in one embodiment, the first phase, the intermediate phase, and the second phase occur consecutively. In other words, no time interval is present among the three phases. In another embodiment, the driving method does not include the intermediate phase and comprises only the first phase and the second phase, wherein the first phase and the second phase occur consecutively.

In an embodiment of the present invention, the switches of the mth gate line is turned on for a first time period so that in the first time period, charging is conducted with the normal driving voltage corresponding to the grey level of the mth gate line. Then, the gate switches of the mth line are all turned off and the switches of the (m+n)th gate line are turned on for a second time so that in the second time period, a second driving voltage is applied to charge the (m+n)th gate line, where m and n are both natural numbers greater than or equal to 1. The first time period and the second time period are consecutive. After the second time period ends, charging is performed for the (m+1) the gate line and the normal driving voltage corresponding to the grey level of the (m+1)th gate lines. The time period in which charging is performed on the (m+1) the gate line is identical to the first time period. After charging of the (m+1)th gate line, a second driving voltage is applied to charge the (m+1+n)th gate line. The time period in which charging is performed on the (m+1+n)th gate line is identical to the second time period. Then, the above process is cyclically performed. The second driving voltage is lower than the normal driving voltage corresponding to the grey level of the specific gate line and using such a lower voltage helps make the liquid crystal molecules quickly resume the lying condition to eliminate trace mura, which is a poor phenomenon of finger touching.

The time interval between the first time period and the second time period for charging the first gate line is proportional to the value of n. The greater n is, the longer the time interval between the first time period and the second time period. For n=1, the time interval between the first time period and the second time period is null. In other words, for the same gate line, a lower voltage is first supplied and then a normal voltage is supplied for charging.

Figure 6:
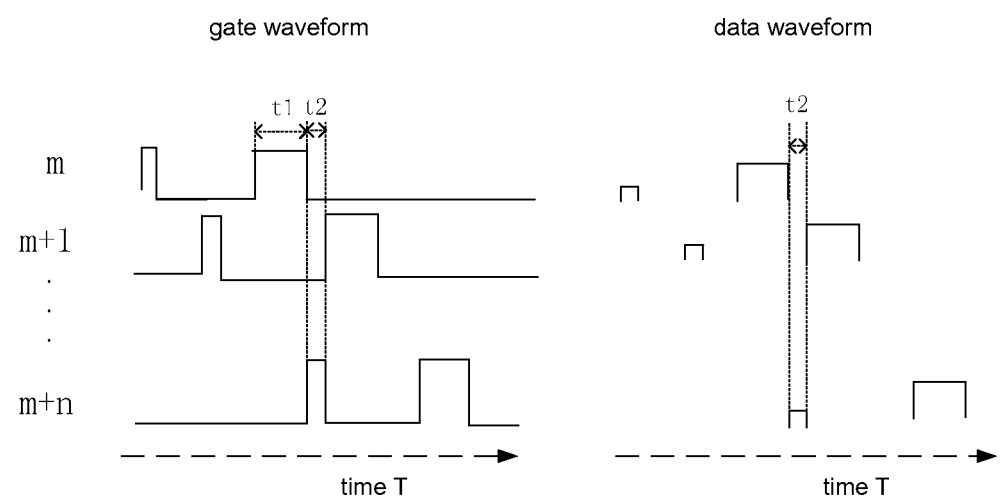
FIG. 6 is s a schematic view illustrating a method for driving a liquid crystal panel according to another embodiment of the present invention.

Specifically, referring to FIG. 6, FIG. 6 shows the mth to (m+n)th gate lines (Gate waveform) and the data lines (Data waveforms). The horizontal axis indicates time T. After a gate line is turned on to charge for a time period t1 and the turned off, the next line is not charged immediately and a time period t2 is preserved to conduct low voltage charging for one subsequent line in order to eliminate the occurrence of trace mura. As shown in the drawing, after the mth (m=0, 1, 2 . . . 255) gate line is turned on for a time period t1 for normal charging, a time period t2 is provided to the (m+n) line (n=1, 2 . . . ) for pre-charging at a low voltage level. The purpose of the low voltage level pre-charging is to supply a lower level of voltage to the (m+n)th line to cause the standing liquid crystal resulting from being pressed by a finger to resume the lying condition. This is performed cyclically to allow the pixels of each line to have a low voltage level charging phase and a normal charging phase. The two phases may not be consecutive in time but are consecutive for n=1.

The lower voltage and the normal voltage as used in the present invention are generally defined with respect to the voltage associated with the corresponding greyscale value and the higher the greyscale value is, the greater the normal driving voltage needed will be. Thus, when the greyscale value is smaller, no two phase charging is necessary and driving is done with only the normal voltage with no trace mura phenomenon occurring. When the greyscale value is larger, the trace mura phenomenon would occur, if driving is done with the corresponding normal voltage, and thus, two-phase charging would be necessary in order to first eliminate the trace mura phenomenon before the application of the normal voltage.

The present invention provides a solution where when the greyscale value of a liquid crystal panel is greater than the first grey level and smaller than the maximum grey level, this being a condition of high grey levels, charging with driving voltage is performed in a two phase manner, which comprises a first phase and a second phase and the first phase is in front of the second phase, wherein the first phase is such that a second driving voltage is applied to drive the liquid crystal panel, where the second driving voltage is smaller than or equal to the first driving voltage; and the second phase is such that a third driving voltage is applied to drive the liquid crystal panel, where the third driving voltage is a normal driving voltage corresponding to the greyscale value. Driving performed in the first phase with the lower voltage would establish a stronger horizontal electric field and a weaker vertical electric field, making it helpful for liquid crystal molecules, which are in a standing condition as being pressed by a finger, to resume a lying condition thereby achieving the purposes of improving a poor phenomenon of finger touching and enhancing the performance of the liquid crystal panel. The third driving voltage used in the second phase is relatively high and may be close to the saturation voltage, making it helpful to increase the transmittance of the liquid crystal panel.

Disclosed above is a preferred embodiment of the present invention. It is appreciated that those having ordinary skills of the art may readily appreciate that various improvements and modifications without departing the principle of the present invention. These improvements and modifications are considered within the protection scope covered by the present invention.

What is claimed is:

1. A method for driving a liquid crystal panel, wherein the liquid crystal panel comprises a plurality of gate lines and a plurality of data lines, the gate lines and the data lines intersecting and perpendicular to each other to form a plurality of pixels arranged in the form of an array, the method for driving the liquid crystal panel comprising:

when a greyscale value of the liquid crystal panel is smaller than a first grey level, a first driving voltage is applied to drive the data lines, the first driving voltage being a normal driving voltage corresponding to the greyscale value; and when the greyscale value of the liquid crystal panel is greater than the first grey level and smaller than or equal to a maximum grey level, driving of the data lines is performed with an operation comprising a first phase and a second phase, the first phase being in front of the second phase, the first phase being such that a second driving voltage is applied to drive the liquid crystal panel and the second driving voltage is smaller than or equal to the first driving voltage, the second phase being such that a third driving voltage is applied to drive the liquid crystal panel, the third driving voltage being a normal driving voltage corresponding to the greyscale value;

wherein when the greyscale value of the liquid crystal panel is greater than the first grey level and smaller than the maximum grey level, an intermediate phase is included between the first phase and the second phase, the intermediate phase being such that a fourth driving voltage is applied and the fourth driving voltage is greater than the third driving voltage and smaller than the saturation voltage in order to increase a response speed of the liquid crystal panel.

2. The method for driving the liquid crystal panel as claimed in claim 1, wherein the first phase, the intermediate phase, and the second phase take place consecutively.

3. The method for driving the liquid crystal panel as claimed in claim 1, wherein switches of an mth one of the gate lines are turned on for a first time period and within the first time period, the normal driving voltage corresponding to the greyscale value of the mth gate line is applied for charging and then the gate switches of the mth line are turned off and switches of an (m+n)th one of the gate lines are turned on for a second time period and within the second time period, the second driving voltage is applied to charge the (m+n)th one of the gate lines, m and n being both natural numbers greater than 1.

4. The method for driving the liquid crystal panel as claimed in claim 3, wherein the first time period and the second time period are consecutive and after the second time period ends, charging is performed on an (m+1)th one of the gate lines and a normal driving voltage corresponding to the greyscale value of the (m+1)th one of the gate lines is used.

5. A method for driving a liquid crystal panel, wherein the liquid crystal panel comprises a plurality of gate lines and a plurality of data lines, the gate lines and the data lines intersecting and perpendicular to each other to form a plurality of pixels arranged in the form of an array, the method for driving the liquid crystal panel comprising:

when a greyscale value of the liquid crystal panel is smaller than a first grey level, a first driving voltage is applied to drive the data lines, the first driving voltage being a normal driving voltage corresponding to the greyscale value; and when the greyscale value of the liquid crystal panel is greater than the first grey level and smaller than or equal to a maximum grey level, driving of the data lines is performed with an operation comprising a first phase and a second phase, the first phase being in front of the second phase, the first phase being such that a second driving voltage is applied to drive the liquid crystal panel and the second driving voltage is smaller than or equal to the first driving voltage, the second phase being such that a third driving voltage is applied to drive the liquid crystal panel, the third driving voltage being a normal driving voltage corresponding to the greyscale value;

wherein when the greyscale value of the liquid crystal panel is greater than the first grey level and smaller than the maximum grey level, an intermediate phase is included between the first phase and the second phase, the intermediate phase being such that a fourth driving voltage is applied and the fourth driving voltage is greater than the third driving voltage and smaller than the saturation voltage in order to increase a response speed of the liquid crystal panel; and wherein the first phase, the intermediate phase, and the second phase take place consecutively.

6. The method for driving the liquid crystal panel as claimed in claim 5, wherein switches of an mth one of the gate lines are turned on for a first time period and within the first time period, the normal driving voltage corresponding to the greyscale value of the mth gate line is applied for charging and then the gate switches of the mth line are turned off and switches of an (m+n)th one of the gate lines are turned on for a second time period and within the second time period, the second driving voltage is applied to charge the (m+n)th one of the gate lines, m and n being both natural numbers greater than 1.

7. The method for driving the liquid crystal panel as claimed in claim 6, wherein the first time period and the second time period are consecutive and after the second time period ends, charging is performed on an (m+1)th one of the gate lines and a normal driving voltage corresponding to the greyscale value of the (m+1)th one of the gate lines is used.

8. A method for driving a liquid crystal panel, wherein the liquid crystal panel comprises a plurality of gate lines and a plurality of data lines, the gate lines and the data lines intersecting and perpendicular to each other to form a plurality of pixels arranged in the form of an array, the method for driving the liquid crystal panel comprising:

when a greyscale value of the liquid crystal panel is smaller than a first grey level, a first driving voltage is applied to drive the data lines, the first driving voltage being a normal driving voltage corresponding to the greyscale value; and when the greyscale value of the liquid crystal panel is greater than the first grey level and smaller than or equal to a maximum grey level, driving of the data lines is performed with an operation comprising a first phase and a second phase, the first phase being in front of the second phase, the first phase being such that a second driving voltage is applied to drive the liquid crystal panel and the second driving voltage is smaller than or equal to the first driving voltage, the second phase being such that a third driving voltage is applied to drive the liquid crystal panel, the third driving voltage being a normal driving voltage corresponding to the greyscale value;

wherein switches of an mth one of the gate lines are turned on for a first time period and within the first time period, the normal driving voltage corresponding to the greyscale value of the mth gate line is applied for charging and then the gate switches of the mth line are turned off and switches of an (m+n)th one of the gate lines are turned on for a second time period and within the second time period, the second driving voltage is applied to charge the (m+n)th one of the gate lines, m and n being both natural numbers greater than 1.

9. The method for driving the liquid crystal panel as claimed in claim 8, wherein the first time period and the second time period are consecutive and after the second time period ends, charging is performed on an (m+1)th one of the gate lines and a normal driving voltage corresponding to the greyscale value of the (m+1)th one of the gate lines is used.

* * * * *